No. 871,515. PATENTED NOV. 19, 1907.
W. G. MULLEN.
VEHICLE WHEEL.
APPLICATION FILED JUNE 19, 1906.
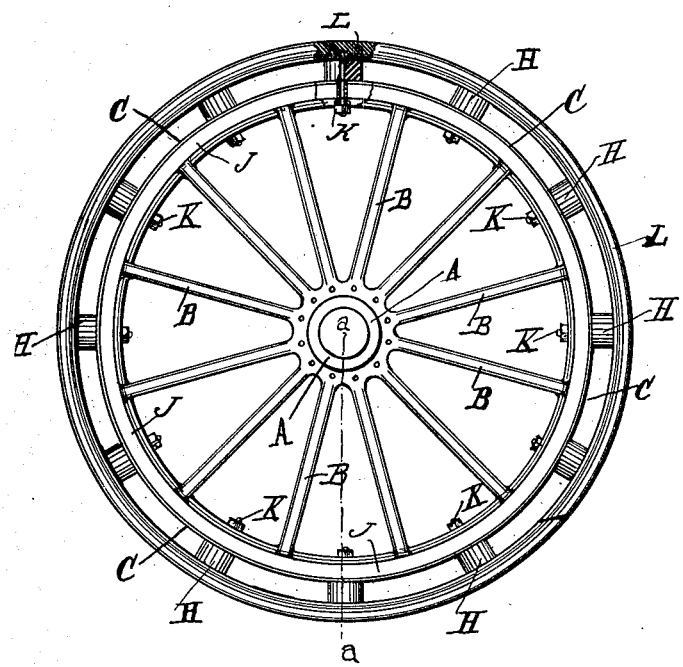
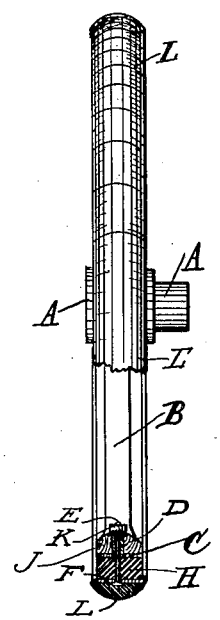
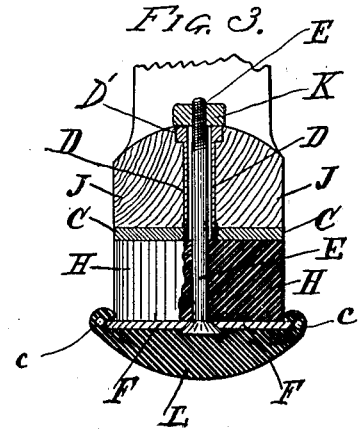
Witnesses;
Inventor.
William G. Mullen.
By St. John Day.
Attorney.

UNITED STATES PATENT OFFICE.

WILLIAM G. MULLEN, OF POMONA, CALIFORNIA, ASSIGNOR OF ONE-HALF TO JOHN A. HENJUM, OF POMONA, CALIFORNIA.

VEHICLE-WHEEL.

No. 871,515.  Specification of Letters Patent.  Patented Nov. 19, 1907.

Application filed June 19, 1906. Serial No. 322,471.

To all whom it may concern:

Be it known that I, WILLIAM G. MULLEN, of the city of Pomona, in the county of Los Angeles and State of California, have invented a new or Improved Vehicle-Wheel, of which the following is a full, clear, and exact description or specification, reference being had to the annexed drawings and to the figures and letters marked thereon.

My present invention has for its object to produce an elastic wheel for automobiles and other vehicles wherein the quantity of india rubber used is considerably reduced from the quantity used in such wheels made by existing methods, and a wheel of considerable elasticity and of light weight is obtained.

Upon the annexed drawings Figure 1, is a side elevation of the improved wheel constructed in accordance with my said invention. Fig. 2, is in the upper part, an end elevation of the same, and in the lower part a vertical transverse section at the middle of the wheel, that is to say, upon the line $a, a$, Fig. 1. Fig. 3, is a transverse section on an enlarged scale through the inner tire and the felly of the wheel, the outer tire, the rubber tire, and tension wires, and showing the connections of the several parts of the same. Fig. 4, is an enlarged elevation of part of the rubber tire showing the wires passing through the india rubber casing.

When the ends of the rubber casing are turned back at the joint for the purpose of leaving the portions of the wire at the joint bare, then the ends of the wires may be soldered or held in contact for being brazed together, and after being soldered or brazed together the joints of wire are filed or scraped smooth and by reason of their smoothness admit of the india rubber casing being again turned over the parts of the wires to be jointed. The ends of the rubber casing are then laid over with india rubber cement and vulcanized at the joint surrounding the wires thereby making a complete joint of the rubber casing extending as a ring or tire all around the wheel.

In Figs. 1, and 2, of the drawings, the hub of the wheel is marked A, and the spokes thereof, of ordinary construction, are marked B. A metallic tire C, is fastened around the felly in the usual manner and the ends of the radial tubes D, are screwed and held rigidly in the tire C, as shown at Fig. 3. The pins E, are held in the outer tire F, and are each passed through cylindrical elastic rubber pads H, passing thence through the tubes D, which are firmly held by being preferably screwed tightly into the inner tire C, by tightening them by a wrench operating upon the enlarged inner ends D' of the tubes D, that is to say, the ends nearest to the interior surface of the felly J. The tubes D, are not only held firmly in the felly J, but the outer tire F, by means of the pins E, is firmly connected to the inner tire C, and the felly J, as shown at Fig. 3. Each of the pins E, being further passed through a soft india rubber cylindrical pad H, thence through a tube D, so that the ends of each of the pins E, project beyond the inner end of the tubes D, that is to say, at the inner face of the felly J, when the nut K, of each pin E, is tightened thereon,—the entire parts of the wheel, namely, the outer tire F, the soft rubber pads H, the inner tire C, the felly J, and the tubes D, are all held firmly together in their proper operative relationship, as shown in the complete wheel Figs. 1, and 2, more especially. The outer tire F, has a covering of soft vulcanized india rubber L, whose form is shown in section at Figs. 2, and 3. This soft india rubber tire has wires $c, c, c, c$, passing completely through it, that is to say, circularly, as shown in the enlarged section Fig. 3, and by the enlarged view of that part of the wheel Fig. 4, whereat the joint of the wires $c, c, c, c$, with each other so as to form complete circles of wires and the joints of the ends of the india rubber covering L, are shown.

After my improved wheel has been put together in the manner hereinbefore described, and shown upon the annexed drawings, the faces of the rubber parts which are shown apart so as to expose these inner faces as in Fig. 4, are coated with india rubber solution and then with the addition of a little sulfur, vulcanized so that the joint is made solid in the well known manner; but before this junction of the india rubber coating is made, the wires $c, c, c, c$, are first tightened and held together while their joining parts are brazed and soldered.

It is obvious that while my improved wheel rolls upon the ground under the influence of a load such as the body of an automobile, the weight carried or supported by the wheel, compresses the lower cylindrical pads H, whereby a soft tread upon the roadway is attained.

I claim as my invention

1. The new or improved vehicle wheel consisting of a hub, spokes, felly and inner tire, said tire having radial tubes screwed into and firmly held therein, an outer metallic tire whereinto radial and inwardly projecting pins are fastened, part of each of which pins pass through each of the said tubes, and the outer part of which pins pass through soft india rubber pads situated between the inner and outer metallic tires, the inner end of each pin being provided with screw nuts for securely fastening the outer tire, the inner tire, the felly, and pads together, the outer tire having a casing of soft vulcanized india rubber incasing it on the tread and at the edges, and held in place by tension wires passing circularly through the soft india rubber casing, substantially as hereinbefore described, and shown upon the annexed drawings.

2. The new or improved vehicle wheel consisting of the combination of a hub, spokes connecting the hub and felly, a felly, an inner tire, said inner tire having radial tubes screwed into and held therein, an outer metallic tire tightened over the felly, radial tubes and pins, said pins fastened into the outer tire and passing through soft rubber pads, thence through the tubes held in the inner tire, tightened nuts upon the inner ends of these pins, rubber pads, an outer tire consisting of a casing of soft vulcanized rubber attached to the outer metallic tire and having wires passing through it circularly, said wires being tightened and brazed, and when brazed holding in place the outer soft rubber casing or tire, all operating in the manner and for the purposes hereinbefore described.

In testimony whereof, I have hereunto set my hand at the city of Pomona, in the presence of two subscribing witnesses.

WILLIAM G. MULLEN.

Witnesses:
S. S. HILLIER,
A. H. TUFTS.